Nov. 1, 1949    J. M. CRANMER    2,486,823
COMPENSATING MEANS FOR LIQUID LEVEL INDICATORS
Filed July 2, 1947
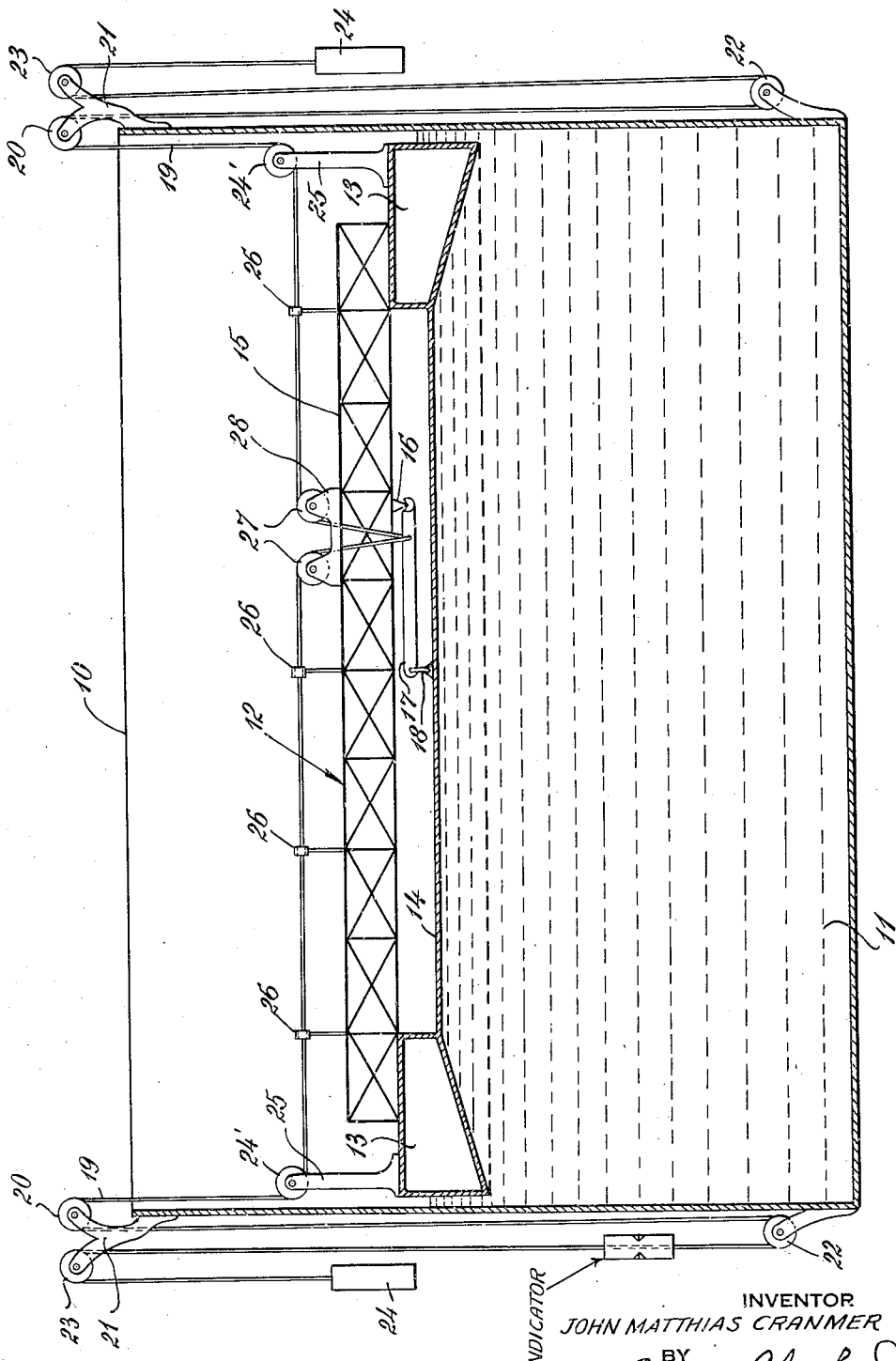
INVENTOR
JOHN MATTHIAS CRANMER
BY
James Y. Cleveland
ATTORNEY Patented Nov. 1, 1949

2,486,823

UNITED STATES PATENT OFFICE 2,486,823

COMPENSATING MEANS FOR LIQUID LEVEL INDICATORS

John Matthias Cranmer, East Providence, R. I., assignor to Socony-Vacuum Oil Company, Incorporated, New York, N. Y., a corporation of New York Application July 2, 1947, Serial No. 758,549

3 Claims. (Cl. 73—321)

This invention relates generally to level gauges or indicating apparatus, such as are suitable for use with liquid storage tanks which employ floating roofs.

In the prior art many devices have been used for indicating or gauging the level of liquid in a storage tank. Outstanding among these are those which are operated by a float. In many instances the float element forms a roof for the tank itself. This is the case in practically all tanks used on "tank-farms" for the storage of crude and light liquid petroleum. The present invention is directed to gauging or liquid level indicator means for tanks of this type. Numerous schemes have been proposed for accurately determining the position of the float or floating roof but insofar as this applicant is aware no one has devised gauging or liquid level indicating means which take into account inaccuracies introduced by loads imposed on the roofs which cause the floating roofs to displace more liquid and thus float lower in the liquid, or which cause a distortion of the roof and thereby produce erroneous indications of the liquid level. Water loads such as those occasioned by rain can be taken care of by proper drain facilities but loads due to snow, sleet, ice, etc. cannot be coped with so readily.

Therefore, the principal object of the present invention is to overcome the above recited difficulties by providing novel means for accurately and automatically compensating for the occasional loading of a floating roof which actuates a liquid level indicator or gauging means.

Other objects and advantages of the present invention will become apparent from the following detailed description when considered with the drawings in which the single figure is a schematic illustration of a vertical section of a floating-roof type storage tank showing the present invention applied thereto.

Referring to the drawing in detail a tank 10 having fluid 11 therein is provided with a floating roof 12. Roof 12 comprises a toroidal pontoon 13 the center portion of which is closed by a sheet metal cover plate 14. One or more truss members 15 are provided which extend horizontally across the pontoon 13. If more than one are used then one of them is located near one diameter of the roof. On the bottom side at a point intermediate the ends of this truss member, but near the center thereof, there is provided a socket bearing 16 which is adapted to receive a ball carried by one end of a lever 17 to form a ball and socket joint. The opposite end of lever 17 is pivotally connected to the top of a substantially vertical link 18. The bottom end of link 18 is secured to the approximate center of the sheet metal plate 14 whereby relative movement between the sheet metal plate 14 and the truss member 15, produced by the flexure of the plate 14, will move the lever 17.

Customarily, in order to determine the position of a floating roof in a tank, one or more cables or tapes are fastened to the roof and around suitably located pulleys to or through a gauge or indicator which will be actuated thereby. The cable or tape is usually provided with fiduciary marks which register with an indicator. The marks may indicate linear displacement of the roof or the quantity of fluid in the tank.

The present invention utilizes conventional apparatus outside the tank. This apparatus is shown schematically in the drawings in which the tapes or cables 19 are shown coming out of the tank 10 and over pulleys 20 which are rotatably mounted on supports 21 that are fixed to the outside of the tank near its top. The cables or tapes 19 pass downwardly along the sides of the tank and under pulleys 22 which are mounted on supports that are carried by the tank at points near the bottom thereof. The cables or tapes 19 then pass upwardly through gauges or indicators to pulleys 23. After they are brought over pulleys 23 suitable weights 24 are secured to their respective ends.

Those portions of cables or tapes 19 which extend downwardly into the tank 10 are passed under pulleys 24' which are carried by suitable supports 25 that are fixed to the pontoon roof 12. The cables or tapes are then brought together through suitable guides 26 at a point located substantially at the center of the roof. At this point a pair of pulleys 27 are mounted on the truss member 15 by support 28. The cables are joined by bringing them together over the pulleys 27 and down between them, through the truss members 15 to the lever 17. The ends of the cables are secured to the lever 17 at a selected point intermediate the ends thereof. Therefore any movement of the lever 17 will produce a longitudinal movement of the cables 19.

In operation when there is no load on the floating roof 12 there will be no flexure of the sheet-metal plate 14 and the indicator will function in the conventional manner to indicate linear displacement of the roof or quantity of liquid in the tank. When the floating roof is loaded, as occasioned by snow, sleet, ice, etc., complete compensation is effected for roof distortion. The load will produce a downward flexure of the sheet-metal plate 14 causing it to displace more fluid resulting in a lifting of the pontoon. The flexure of plate 14 creates a relative movement between the plate and truss member 15. This action takes up some of the length of the cables or tapes 19 through the medium of lever 17. This take-up in the cables or tapes is regulated by properly selecting the point where the cables or tapes are fastened to the lever 17 to just compensate for variations in roof load.

Additionally the amount of flexure of plate 14 can be magnified to any desired degree by properly selecting the length of lever 17 and the point on the lever at which the cables or tapes are secured.

I claim:

1. A liquid level indicator for oil storage tanks that comprises in combination a sheet-metal roof, a toroidal pontoon adapted to float on the liquid in the tank and support the roof, liquid level indicating means located outside of the tank, means associated with said indicating means and connected indirectly to the sheet-metal roof for indicating the level of the roof in the tank, and means interposed between said last means and the roof, operable by the flexure of the roof, for compensating for errors in liquid level indications due to loads, such as snow, sleet, ice, etc., on the roof.

2. A liquid level indicator for oil storage tanks that comprises in combination a sheet-metal roof, a toroidal pontoon adapted to float on the liquid in the tank and support the roof, liquid level indicating means located outside of the tank, means associated with said indicator and connected through linkage to the sheet-metal roof and operable by the flexure of the roof for indicating the level of the roof in the tank, said connecting means comprising means for compensating for errors in liquid level indications that are due to roof distortion occasioned by loads occasioned by snow, ice, sleet, etc.

3. A liquid level indicator for oil storage tanks that comprises in combination a sheet-metal roof, a toroidal pontoon adapted to float on the liquid in the tank and support the roof, a horizontal truss member extending across and connecting opposite sides of the pontoon, liquid level indicating means located outside of the tank, means associated with said indicator and connected indirectly to the sheet-metal roof for indicating the level of the roof in the tank, and means interposed between said last means and the roof for compensating for errors in liquid level indications due to loads, such as snow, sleet, ice, etc., on the roof, said last recited means comprising a lever, means for pivotally securing one end of said lever to the truss member, means for pivotally securing the other end of the lever to the sheet-metal roof, and means for connecting the means associated with said indicator to said lever at a selected point intermediate the ends thereof, whereby relative movement between the truss member and sheet-metal roof will effect a compensation for errors in liquid level indications due to loads on the roof.

JOHN MATTHIAS CRANMER.

REFERENCES CITED

The following references are of record in the file of this patent:

UNITED STATES PATENTS

| Number | Name | Date |
| --- | --- | --- |
| 1,988,808 | Pierce | Jan. 22, 1935 |
| 2,086,645 | Staber | July 13, 1937 |
| 2,117,185 | Lynskey | May 10, 1938 |
| 2,237,461 | Tokheim | Apr. 8, 1941 |
| 2,282,772 | Wiggins | May 12, 1942 |